United States Patent [19]

Merritt et al.

[11] Patent Number: 4,513,332
[45] Date of Patent: Apr. 23, 1985

[54] DISK DRIVE HAVING FINE AND COARSE CONTROL OF THE READ/WRITE HEAD

[75] Inventors: Lauren V. Merritt, Los Altos; William R. Maclay, Los Gatos, both of Calif.

[73] Assignee: Datacopy Corporation, Mountain View, Calif.

[21] Appl. No.: 405,206

[22] Filed: Aug. 4, 1982

[51] Int. Cl.³ .............................................. G11B 21/10
[52] U.S. Cl. ....................................................... 360/77
[58] Field of Search ...................... 360/75, 77, 78, 109; 369/43, 44, 41, 219

[56] References Cited

U.S. PATENT DOCUMENTS

| | | | |
|---|---|---|---|
| 3,119,989 | 1/1964 | Wasylenko | 360/78 |
| 3,199,092 | 8/1965 | Hoffman | 369/41 |
| 4,151,569 | 4/1979 | Hathaway | 360/77 |
| 4,151,570 | 4/1979 | Ravizza et al. | 360/77 |
| 4,188,645 | 2/1980 | Ragle et al. | 360/75 |
| 4,399,477 | 8/1983 | Bryer | 360/106 |
| 4,453,243 | 6/1984 | Tanaka et al. | 369/221 |

Primary Examiner—George G. Stellar
Attorney, Agent, or Firm—Owen L. Lamb

[57] ABSTRACT

A disk drive having a head actuator that is capable of quick, fine adjustments in position of the transducing head in order to precisely follow data tracks. A magnetic read/write head (2) is mounted on a first arm (4) so that it can move generally along a radius of a disk (8). A rotary motor (12) is used to spin the disk. A primary motor (36) in conjunction with a cable (42) and drum (40) is used to move the arm-mounted head in coarse movements across the disk. A secondary motor (32) in conjunction with a second arm (34) is used to move the arm-mounted head in fine movements across the disk. The primary motor may be used for track jumping, while the secondary motor may be used for track following.

1 Claim, 5 Drawing Figures

DISK DRIVE HAVING FINE AND COARSE CONTROL OF THE READ/WRITE HEAD

CROSS-REFERENCE TO RELATED APPLICATIONS

U.S. patent application Ser. No. 371,862 of Armin Miller, et al., entitled "Image Reader for Use with an Electronic Camera," filed on Apr. 26, 1982, and assigned to Datacopy Corporation.

U.S. patent application Ser. No. 386,862 of Charles Lindberg, et al., entitled "A Spiral Track Disk Drive," filed on June 10, 1982, and assigned to Datacopy Corporation.

BACKGROUND OF THE INVENTION

1. Field of the Invention

The invention relates to moving media technology and, more particularly to an improved mechanism for positioning a transducing head on a recording disk.

2. Description of the Prior Art

In the above-referenced copending U.S. patent application Ser. No. 386,862 of Charles Lindberg, et al. there is described a disk drive that generates a smooth spiral during the recording of data so that the recording operation is continuous. By superimposing onto the spiral-generating mechanism the capability of modifying the instantaneous head position, the recorded track is followed during playback. A magnetic read/write head is mounted so that it can move generally along a radius of a disk. A rotary motor is used to spin the disk and to drive a gear train. The output of the gear train is used to move the mounted head across the disk. The pitch of the spiral generated is controlled by the relative gear ratio between the disk and the head mechanism. Rapid retrace of the head mechanism to its starting position is accomplished by placing a return spring on the head mechanism and a clutch in the gear train. The apparatus will reliably generate a spiral over and over again. The operation of the clutch, however, scrambles the relationship between the disk and the head so that a second spiral is not likely to exactly coincide with an earlier spiral. Removing and reinserting the disk from the drive will also scramble the orientation of the spiral. Furthermore, two disk drives will not, due to manufacturing variations, generate the same pitch spiral. To resolve these problems, the connection from the gear train to the head mechanism is made variable, under the control of a second motor, so that the head can be made to follow the previously-recorded track. The track following can be done by dithering the head and using the demodulated head output as a steering signal, as described in the above-referenced patent application Ser. No. 371,862 of Armin Miller, et al. The mechanism does not, however, produce a means for moving the head rapidly across the disk to rapidly locate a particular track.

Presently-available disk drives do have mechanisms for spinning the disk and for rapidly moving the head across the face of the disk to rapidly locate a particular track. These two motions are usually accomplished with two motors since their basic characteristics are different. The disk is spun smoothly at a constant speed while the head is jerked violently from one track to another. Higher-performance disk drives are capable of high performance because the head actuator is quicker, and thus usually more powerful. In multidisk drives, where several disks are on a single spindle and where several heads are moved together, the resulting head-actuator mechanism is very bulky.

At the current state of the art, disk drives are becoming faster because of quicker head actuators, and they are also increasing their storage capacity. Improved magnetic materials and read/write heads contribute to this increased capacity by increasing the bits stored per linear inch of recorded track. Further improvements are being made by increasing the number of tracks per inch. As the number of tracks per inch has increased, the head actuator indexing mechanism for determining the exact location of a track has becomed more sophisticated. As the art has progressed, stepper motors driving cams have given way to DC motors, linear or rotary, controlled by linear incremental encoders, which are followed by servo control tracks on the magnetic surfaces themselves. The head actuator must be strong and powerful in order to jump quickly across a disk, and yet be able to precisely follow tracks which, as the state-of-the-art progresses, become finer and finer. Further, as the track densities become greater, the imperfections of the disk-spinning operation become more and more unavoidable, imperfections like bearing eccentricities, differential thermal expansion of the disk, vibrations in the mounting base, vibrations in the disk, etc. Thus, the head mechanism must also be capable of quick, fine adjustments in position in order to precisely follow the tracks. This requires a fine, light mechanism, a mechanism that is in contrast to the large, powerful mechanisms used in the past. This contrast in mechanism requirements has led to the present invention.

The primary object of this invention is to provide an improved mechanism for positioning a head on a disk, thereby achieving increased performance at lower cost.

A further object of this invention is to provide an improved mechanism for positioning a head on a disk which is less bulky than currently-available mechanisms.

SUMMARY OF THE INVENTION

Briefly, the invention is concerned with a head actuator which is provided with two motors, a primary motor for track jumping, and a secondary motor for track following. The primary motor is strong, powerful, capable of long, coarse motions and can be relatively big and heavy. The secondary motor is capable of short, fine motion, thus can be small and lightweight. The smaller motor may ride on the armature of the larger motor, or it may be mounted on the common base plate along with the primary motor and the disk spinner and disk assembly. In either case, the mechanical outputs of the coarse primary motor and the fine secondary motor combine to control the head position.

The foregoing and other objects, features, and advantages of the invention will be apparent from the following more detailed description of the preferred embodiments of the invention, as illustrated in the accompanying drawings.

DESCRIPTION OF THE INVENTION

Figure 1:
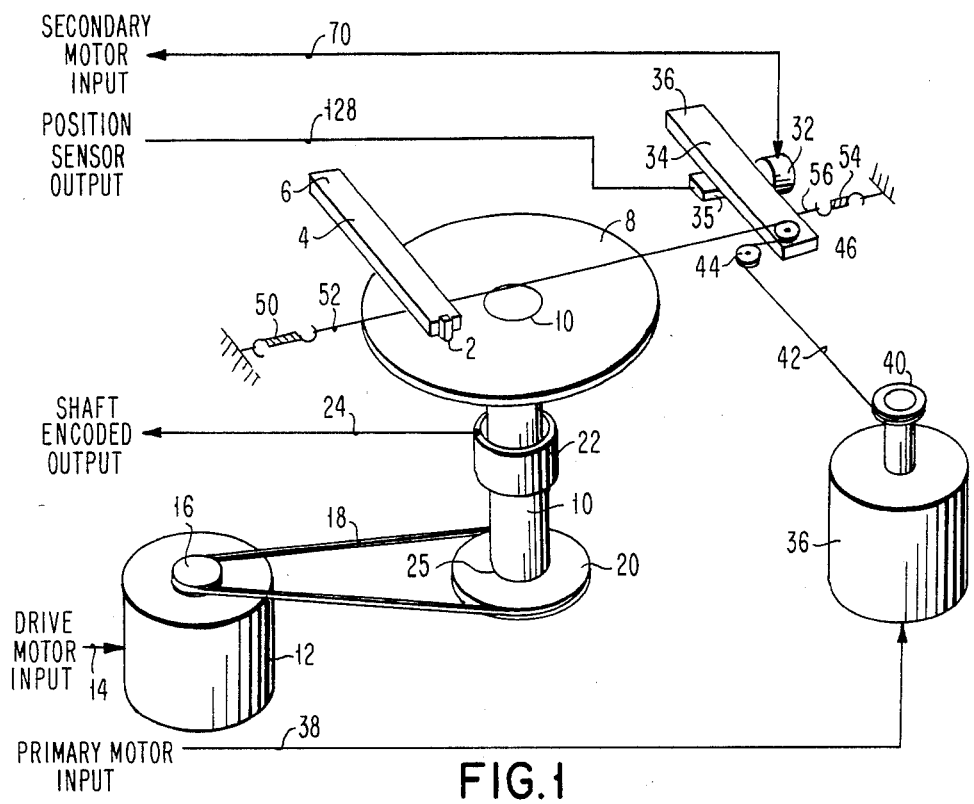
FIG. 1 is a perspective view of a disk drive in which the present invention is embodied.

Referring to FIG. 1, a magnetic read/write head (2) is mounted on a first arm (4) which rotates on pivot or bearings (6). This first arm (4) is so positioned that head (2) moves in a generally radial direction across the surface of a disk (8), under control of a primary motor (36) and a secondary motor (32). The primary motor (36) may be either an incremental or nonincremental motor, for example, but not limited to, a rotary motor. The secondary motor (32) may be either an incremental or nonincremental motor, for example, but not limited to, a motor of a linear, audio-speaker type. The disk (8) is mounted on a disk spinner, for example, but not limited to, a disk turntable, disk spindle, etc. on a disk spinner shaft (10). A disk drive motor (12) is controlled by signals on disk drive motor input leads (14). The motor (12) is equipped with a motor pulley (16) which is connected by a belt (18) to a disk spinner shaft pulley (20) on disk spinner shaft (10) so that the disk (8) can be rotated by the motor (12). Shaft (10) is equipped with a rotary incremental encoder (22) which provides information about the angular position of the shaft (10) on shaft encoder output leads (24).

A belt (18) and pulleys (16, 20) between the motor (12) and the shaft (10) isolates the disk (8) from the motor vibrations and cogging, and avoids the mechanical complexity of having the motor on the same shaft as the disk. Selecting the diameters of the pulleys (16, 20) for a speed reduction allows the motor (12) to run at a more efficient operating point. The information from the shaft encoder (22) may be used to control the speed of the motor, the position of the arm, or to guide the recovery of track-following information recorded on the disk.

The secondary motor (32) is attached to a second arm (34), which rotates on pivot or bearings (36). This second arm (34) is so positioned that it moves sympathetically with first arm (4). When energized, linear motor (32) exerts force on the second arm (34) and thus controls its position.

The primary rotary motor (36), controlled by signals on primary motor input leads (38), is equipped with a drum (40) on which a cable (42) is wrapped. This cable (42), upon leaving drum (40), wraps around a baseplate-mounted idler (44), and then wraps around an idler (46) mounted on second arm (34). The extreme end of cable (42) is attached to first arm (4). When the cable (42) is held taut, it applies forces to the first arm (4) and the second arm (34). Spring (50) and its auxiliary cable (52) provide a counter-force for arm (4), and spring (54) and its auxiliary cable (56) provide a counterforce for arm (34). This cable/drum mechanism is similar to the mechanism shown in FIG. 1 of the above-referenced U.S. patent application Ser. No. 386,862 of Charles Lindberg, et al., entitled "A Spiral Track Disk Drive", except that the clutch has been replaced with the primary motor (36).

The mechanism of the present invention operates as follows. The turning of motor (36) in a counter-clockwise direction winds cable (42) onto the drum (40). The turning of motor (36) in a clockwise direction allows the cable (42) to unwind from drum (40) as a result of the counter force exerted by the spring (50). Since arm (34) is held stationary by the balancing forces of motor (32) and spring (54), arm (4) will move in direct proportion to the distance traveled by any point of cable (42). The idlers (44) and (46), which control the angle at which cable (42) arrives at and departs from arm (34), are arranged so that cable (42) approaches and leaves arm (34) at a right angle to the radius line between the center of pivot (36) and the center of idler (46). Thus, any motion imparted to the center of idler (46) will cause two cable lengths to be pulled, the cable length attached to the drum (40), and the cable length attached to the arm (4). Since the cable end attached to drum (40) is fixed (unmovable in response to changing cable tension), while the cable end attached to arm (4) is movable, the attachment point of cable (42) to arm (4) will move twice as far as the distance moved by the center of idler (46). As a result, the first arm (4) is positioned grossly by the large motion of motor (36) and the first arm (4) is positioned finely by small motion of motor (32). As a consequence, the secondary motor (32) that is capable of fine motion can be made with a short stroke, while the primary motor (36) that is capable of a large motion need not be very accurate. All motors, pivots, and springs in the above descriptions are mounted on a common base plate.

Those skilled in the art can, of course, develop alternate techniques for achieving the results described above. A nonexhaustive list of some alternatives is: use of a torsion spring around the arm pivots rather than linear springs; use of a rotary motor for the secondary motor rather than the linear motor; use of a feedback-control loop to enhance the action of secondary motor (32) and thus effectively increase the stiffness of spring (54); use of a basically linear mechanism for the arms (4) and (34) instead of the described rotary mechanism; use of a different configuration of idlers (44) and (46) to obtain a different mechanical advantage, a different motion ratio between the center of idler (46), and the attachment point of cable (42) to arm (4); use of a band instead of the cable (42); and use of a continuous cable around pulleys instead of the end-to-end arrangement shown.

Figure 2:
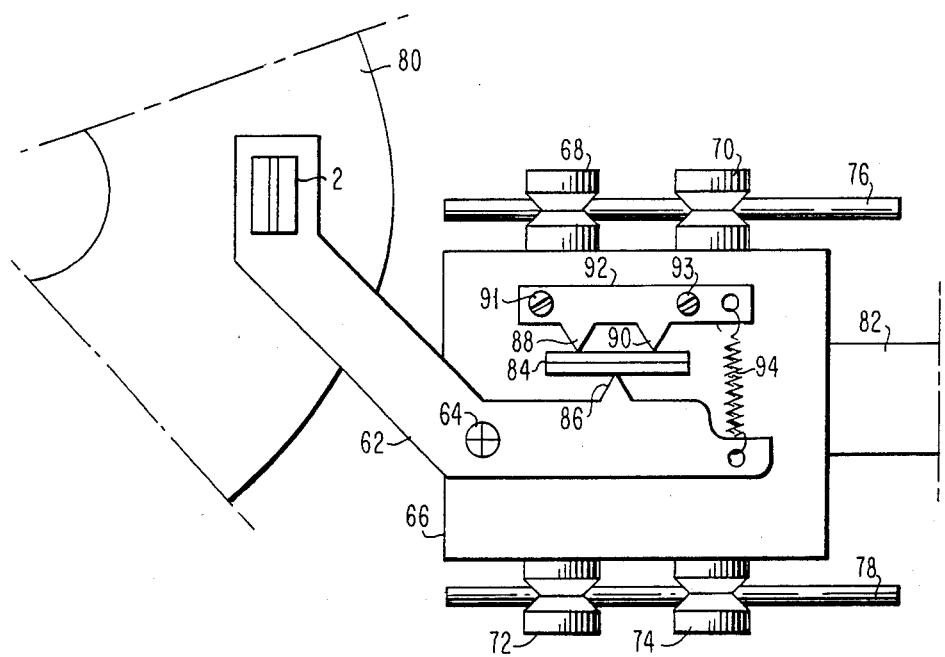
FIG. 2 is a top view of a second embodiment of the present invention in which read/write head and arm and the track-following mechanism are comprised of the armature of a secondary motor which serves as a variable extension of the armature of a primary motor.

Referring now to FIG. 2, an alternative to the cable/drum embodiment of FIG. 1 is shown. In FIG. 2 a magnetic read/write head (2) is shown mounted on an arm (62), which rotates around a pivot (64), which is embedded in a carriage (66). Carriage (66) is constrained by grooved bearings (68, 70, 72, 74), which are in contact with guide rails (76 and 78). The assemblage is capable of linear motion parallel to a radius of disk (80). The disk (80) is located close to the active surface of head (2), such that the head (2) is able to move along a radius of the disk (80). The movement of the carriage (66), with respect to a base plate (not shown), is controlled by shaft (82), which connects to a primary motor (not shown), which is preferably a linear motor similar to the linear motor (32) shown in FIG. 1. The movement of arm (62), with respect to carriage (66), is controlled by a secondary motor, which is preferably an electrically actuatable means. The electrically actuatable means, may be, for example, a piezoceramic-bender element (84), mounted between contact point (86) on arm (66) and contact points (88) and (90) of block (92). The block (92) is immovably fixed to carriage (66) by screws (91 and 93). Spring (94) serves to pull arm (66)

towards block (92) and thus clamp the bender element (84) between the contact points (86, 88, 90).

The several motions that can be performed are as follows. The carriage (66) can move head (2) along a radius of disk (80). An electrical signal applied to the piezoceramic-bender element (84) will cause it to bend, imparting rotary motion to lever (62) around pivot (64). The consequential motion of head (2) depends on the angle between a fist vector extending from the center of rotation of disk (80) to the actual magnetically-active area of head (2) and a second vector extending from the center of rotation of arm (64) to the same magnetically-active area of head (2). Inasmuch as these two vectors are perpendicular to each other, rotation of arm (64) will cause head (2) to move along the disk-radius vector. This is the direction of motion for track following. Inasmuch as these two vectors are parallel, rotation of arm (64) will cause head (2) to move in the same direction as the surface of the disk and will cause position errors as data is recorded, and time-base errors as data is reproduced.

It will be understood that, if several disks are stacked on one spindle, several find-head actuators (secondary motors) can be stacked on one carriage. Indeed, this stacking will be useful if both sides of single disks are to be worked at the same time. Disks are known to have several vibration modes perpendicular to the plane of their rotation. A transducing head which is pushed by such flutter away from the plane of rotation must be moved rimward (towards the outside edge or rim of the disk) in order to stay on track, while a head that is sucked towards the plane of rotation must be moved hubward (towards the center or hub of the disk). If the individual fine-head actuators are made thin enough, they can be placed between the several disks in the stack and pivot (64) will be favorably located. Any other construction would require an undesirably long-radius arm from pivot (64) to head (2), or a poor angle between the vectors described.

Those skilled in the art will, of course, be able to develop alternate techniques for achieving the results described above. A nonexhaustive list of some of the alternatives is: use of rotary motion on carriage (66) instead of the linear motion described; use of an electromagnetic-force transducer instead of a piezoceramic-force transducer; use of an air bearing for the carriage instead of the track and wheels shown; use of a linear mechanism for the fine-head actuator instead of the rotary mechanism shown; and use of a balanced lever arm (62) so linear motion by shaft (82) does not generate rotary motion in arm (62).

What is important is that the head be positioned coarsely by large motion of carriage (66) in response to actuation of the primary motor, and positioned finely by small motion of lever (62) in response to actuation of the secondary motor. As a consequence, the mechanism that is capable of fine motion can be made with a short stroke and little mass, and thus be capable of high-frequency response, while the mechanism that is capable of a large motion can be made with a long stroke and greater mass, and need not be capable of high-frequency response.

A disk drive controller will now be described that makes use of the above-disclosed mechanism to deal with one of the classic problems of disk drives having removable disks. In disk drives having removable disks, the disks do not always spin around their geometric centers. This is because when a disk, having a recording on it, is removed from the drive and then replaced, its new orientation causes the disk to revolve around a different center of rotation. Disk drive design involves a trade-off in terms of increasing the track density, which means more tracks per inch, fewer inches per track, and the accuracry of the mechanism for centering the disk each time it is inserted in the drive. An alternative to progressively more expensive disk-centering mechanisms is to make the head-positioning mechanism capable of following the eccentricities that develop when a disk is removed from the drive and then replaced again.

Figure 3:
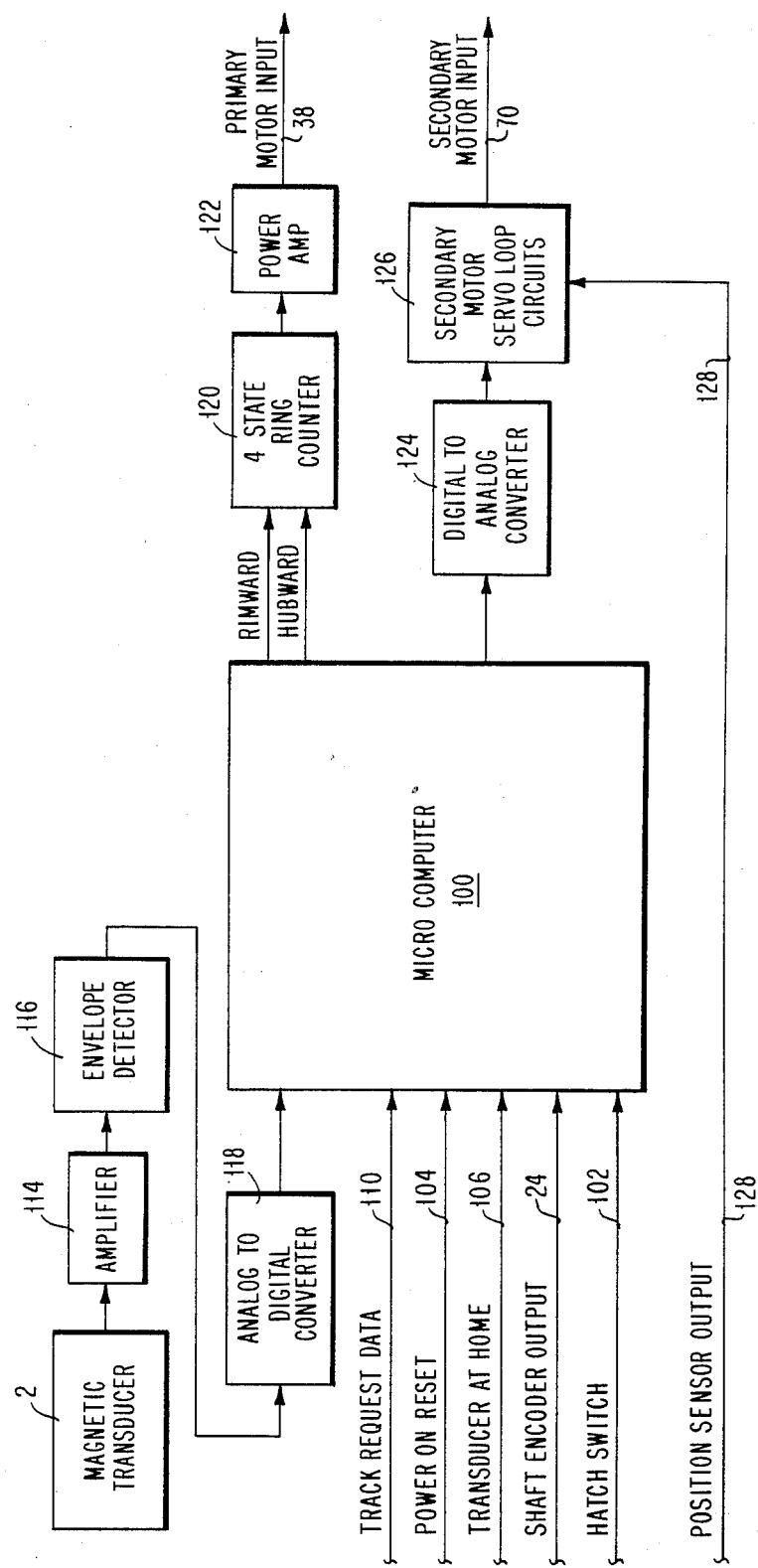
FIG. 3 is a block diagram of control electronics that could be used for controlling the mechanisms shown in FIGS. 1 and 2.

Referring to FIG. 3, a microcomputer (100) composed of a microprocessor, for example the Rockwell 6500, having a program EPROM, and a RAM, receives signals from a hatch switch (102), power-on reset (104), transducer-at-home sensor (106), and a shaft encoder output (24) from the shaft encoder (22) shown in FIG. 1. The microcomputer (100) receives track request data (110), sent by, for example a host computer, which identifies the track which the magnetic transducer (2) should be on. The microcomputer (100) receives a signal being read from the disk through the operation of the transducer (2), an amplifier (114), an envelope detector (116), and an analog-to-digital converter (118).

The microcomputer (100) controls the primary motor (36, FIG. 1), for example a stepping motor, through a four-state ring counter (120) which keeps track of which winding (A or B) is connected to which supply voltage (plus or minus). Only one winding at a time is energized. The energizing sequence of $+A$, $+B$, $-A$, $-B$ would give motion in one direction while the sequence $+A$, $-B$, $-A$, $+B$ would give motion in another direction. The actual windings of the stepping motor (36) are driven by the ring counter (120) through power amplifier (122).

The microcomputer (100) controls the secondary motor (32, FIG. 1) through the use of a digital-to-analog (DAC) converter (124). The DAC in turn drives the analog secondary motor servo loop circuits (126) used to close a position loop around the secondary motor (32) through the use of position sensor output (128). The position sensor (35) for arm (34) is not shown in detail in FIG. 1. Reference should be made to the above-referenced U.S. patent application Ser. No. 386,862 of Charles Lindberg, et al., for details of such a sensor.

Figure 4:
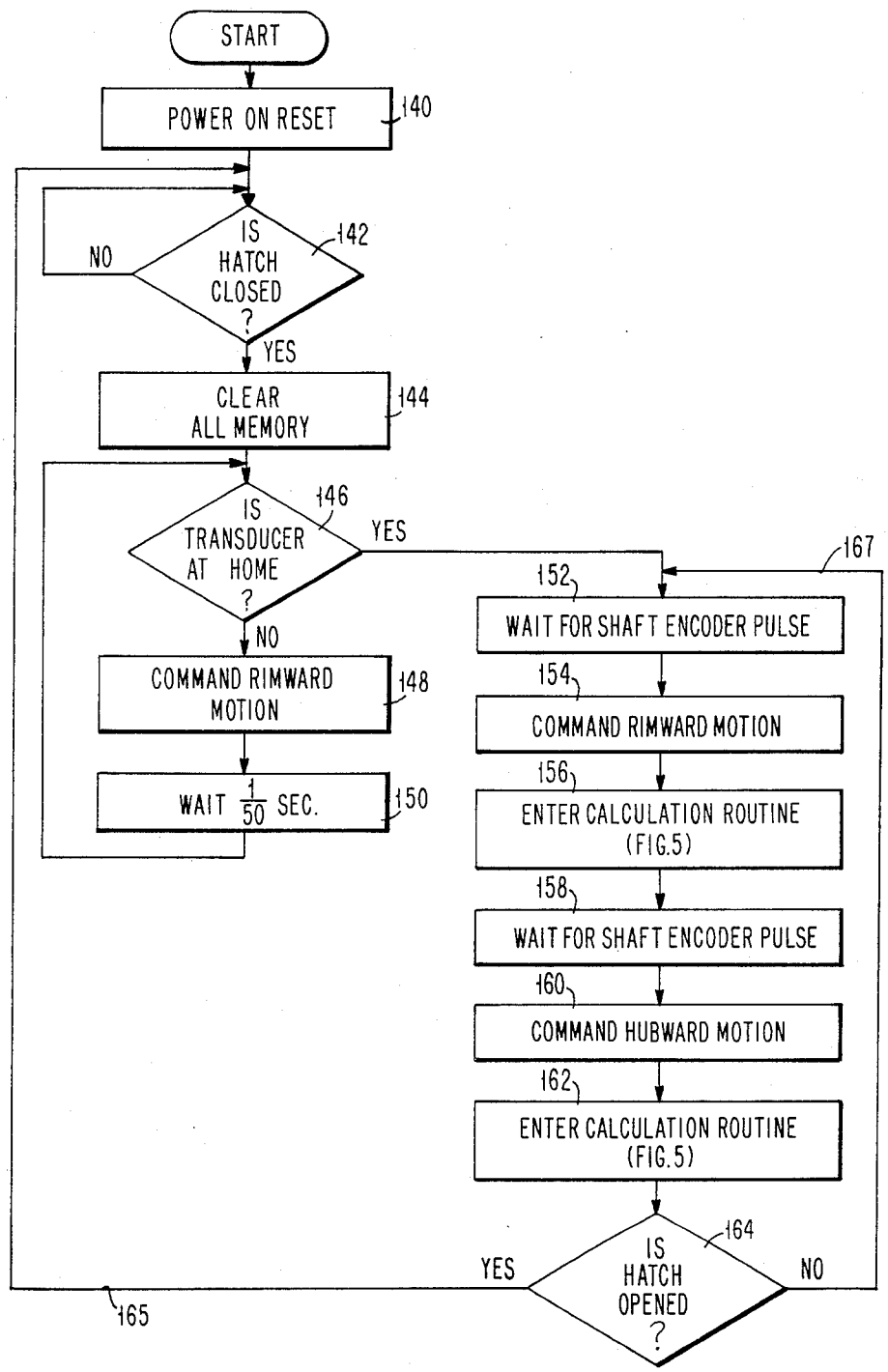
FIG. 4 is a flow chart of the operation performed by the circuits shown in FIG. 3; and, FIG. 5 is a flow chart of the calculation routine performed by blocks 156 and 162 of FIG. 4.
Figure 5:
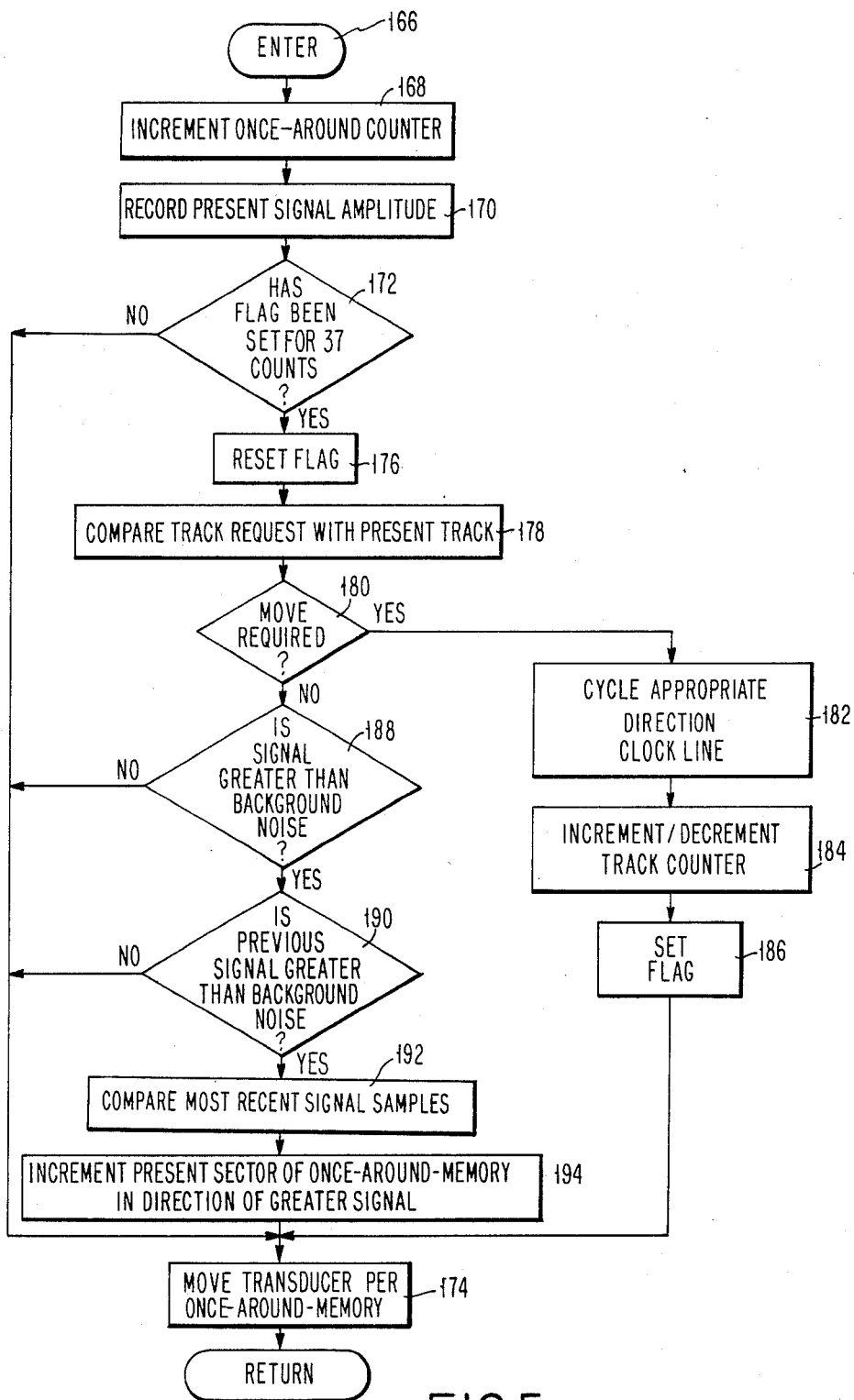

Refer now to FIGS. 4 and 5 which are flow charts of the operation of the circuits shown in FIG. 3. The power-on reset state (140) is held until the hatch switch closes (142), which indicates that a disk has been placed in the disk drive. All memory locations in the RAM of mircocomputer (100) which are used to store results of the operations to follow are cleared (144). A check is made to see if the transducer (2, FIG. 3) is in its home position (146). If not, a go-rimward command is given (148), followed by a wait (150) for the amount of time it should take for the motion to be accomplished.

Once the absolute position of the transducer has been established, the transducer is vibrated, or dithered, at a frequency controlled by the shaft encoder (22, FIG. 1) by the following technique. When a first-shaft-encoder pulse arrives (152) from the shaft encoder (22), the transducer is given a command to move rimward by suitably changing the DAC (124). A calculation subroutine (156) is entered (FIG. 5) and is finished before the next shaft-encoder pulse arrives (158), at which time the transducer is is given a command to move hubward (160). The calculation subroutine is entered again (162)

and is finished before the hatch is checked to see if it has opened (164). If the hatch has opened, the disk is being pulled out and the sequence branches back (165) to the state of waiting for the hatch to close (142). If the hatch has not opened, the sequence branches back (167) to the state of waiting for shaft-encoder pulse (152). Thus, it is seen that the transducer is vibrated at a disk-spin controlled rate. The distance of the vibration is small, only plus or minus one-tenth of a track width at most. The vibration rate is changed by changing the number of counts per revolution of the shaft encoder (22).

The above description implies that the transducer moves instantaneously. It will not, of course. Any system has its acceleration limits and thus its response time. In fact, each motion will be completed about the time that the reverse motion is requested. The faster the vibration, the more the information that can be acquired, and that information allows greater system performance. The advantage enjoyed by the present invention is that the dithering is done by the small secondary motor only; the primary motor need not be involved.

The calculation subroutine entered at block (156) and block (162) of FIG. 4, is shown in detail in FIG. 5. The first step is to increment a once-around counter (168) located within the microcomputer (100, FIG. 3), which keeps track of the memory space in the RAM of the micrcomputer (100) used for storing the results of each calculation. The once-around counter memory space will eventually contain the information required to guide the secondary motor along any previously-recorded track. Then the transducer can be moved to an unwritten location and another track recorded that is exactly concentric with an earlier recording, even though the disk was reoriented in the interim.

Having incremented the once-around counter (168), the present signal amplitude is recorded (170) and a flag (described below) is checked (172). What is checked at this decision block (172) is whether the flag has been set for the previous thirty-seven shaft-encoder pulses. If no, the next step is to put the contents of the present space of the once-around counter out to the transducer (174) and continue monitoring the shaft encoder. If yes, the flag is reset (176), and the present track number, stored in a track-counter memory space, is compared with the track being requested (178). Information as to the track being requested is received from, for example, the host computer over track request data line (110, FIG. 3). If a move to the correct track is required, the appropriate direction clock line is cycled (182) so that the 4-state ring counter (120) actuates the primary motor to move the transducer in the desired direction. Next, the track-counter memory space is incremented or decremented (184) so that the microcomputer (100) knows where the transducer (2) is. The flag is then set (186) to indicate to the microcomputer that the stepping motor (36) is in motion, and any further track-following computation is unwarranted.

If a move was not required, the decision at block (180) is no, and the flow proceeds to decision block (188). Decision block (188) examines the amplitude of the signal read from the place on the disk at which the transducer is presently located. If the signal is not greater than background noise, there is no track to follow, so nothing further is done except to move the transducer position to the present sector (174) as indicated in the once-around memory.

If the signal checked at decision block (188) is greater than background noise, a second check is then made (190) to see if the previous signal sample was greater than background noise. This double check helps to avoid missteering due to dropouts. If the previous signal is not greater than background noise, there is no track to follow, so nothing further is done except to move the transducer (174) to the position indicated in the once-around memory space.

If the previous signal checked at decision block (190) is greater than background noise, two valid sequential samples exist, and a comparison is made between the present signal and the previous signal (192) to determine where the transducer really ought to be. If the difference in the samples is zero, the transducer must have crossed track centerline in the time between the two samples, and the contents of the once-around memory space need not be changed. If the difference in the samples is other than zero, the present sector in the once-around counter is incremented in the direction of the greater signal (194) so that next time around the disk, the transducer will be at the correct track position. The memory contents for the next several sectors ahead are also changed to take advantage of the information presently acquired.

Those skilled in the art will, of course, be able to develop alternate techniques for achieving the results described above. A nonexhaustive list of some of the alternatives is: use of a different microprocessor; use of a high-frequency oscillator phase locked to a once-around pulse for controlling the dithering rather than using multiple pulses from a shaft encoder; use of multiple heads that ride on opposite sides of the track, thus making dithering unnecessary; use of preformatted disks that have servo information prerecorded for all tracks. The advantage of the present invention is that, once the required correction has been computed by whatever means, the mechanism that accomplishes the correction can be extremely lightweight and thus very quick.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A disk drive for recording and reproducing information in a magnetically-recorded data track on the surface of a disk placed on a disk spinner, comprising:
    a transducer for recording and reproducing data signals with respect to said disk;
    first-moving means, energizable for moving said transducer in coarse movement generally along a radius of said surface of said disk, between the rim of said disk and the operational center of said disk;
    second-moving means, energizable for moving said transducer in fine movements generally along said radius of said surface of said disk;
    third-moving means for spinning said disk spinner;
    control means, coupled to said first-moving means and to said second-moving means so that said transducer is selectively moved, through energization of said first-moving means, from track to track over the surface of said disk, and is caused to precisely follow a track selected by energization of said first moving means, through energization of said second-moving means;
    said first-moving means including a cable wound around a drum, one end of said cable being connected to said transducer, such that as said first-moving means is energized and disenergized, said cable is wound onto said drum or unwound from said drum, to thereby move said transducer in coarse movements generally along said radius of said surface of said disk, and, said second-moving means including means for exerting a force on said cable such that as said second-moving means is energized and disenergized, the effective cable length is changed to thereby move said transducer in fine movements generally along said radius of said surface of said disk.

* * * * *